United States Patent
Harvey

(10) Patent No.: US 7,036,929 B1
(45) Date of Patent: May 2, 2006

(54) METHOD AND DEVICE FOR THE APPLICATION AND REMOVAL OF DISPOSABLE CORRECTIVE OPTICAL FILM TO AN EYEGLASS LENS

(76) Inventor: William Rolf Harvey, 15-330 Kahakai Blvd., Pahoa, HI (US) 96778

( * ) Notice: Subject to any disclaimer, the term of this patent is extended or adjusted under 35 U.S.C. 154(b) by 0 days.

(21) Appl. No.: 10/822,569

(22) Filed: Apr. 12, 2004

(51) Int. Cl.
*G02C 7/02* (2006.01)

(52) U.S. Cl. .................. 351/159; 351/177; 351/47

(58) Field of Classification Search ........... 351/44–49, 351/51, 159, 163, 165, 177–178
See application file for complete search history.

(56) References Cited

U.S. PATENT DOCUMENTS

| | | | |
|---|---|---|---|
| 2,511,329 A | 6/1950 | Craig | 351/47 |
| 2,759,394 A | 8/1956 | Evans | 351/47 |
| 3,236,579 A | 2/1966 | Evans | 351/47 |
| 3,628,854 A | 12/1971 | Jampolsky | 351/175 |
| 5,412,438 A | 5/1995 | Bolle | 351/44 |
| 5,478,824 A * | 12/1995 | Burns et al. | 351/172 |
| 5,617,153 A | 4/1997 | Allen et al. | 351/45 |
| 5,748,279 A * | 5/1998 | Glanzbergh | 351/45 |
| 5,764,333 A | 6/1998 | Somsel | 351/47 |
| 5,790,230 A | 8/1998 | Sved | 351/138 |
| 6,170,952 B1 * | 1/2001 | La Haye et al. | 351/168 |
| 6,290,354 B1 | 9/2001 | Safran | 351/57 |
| 6,557,995 B1 | 5/2003 | Edwards | 351/47 |
| 2003/0090622 A1* | 5/2003 | Takeuchi | 351/159 |

FOREIGN PATENT DOCUMENTS

| | | |
|---|---|---|
| JP | 5072504 | 3/1993 |
| WO | WO95/24669 | 9/1995 |

* cited by examiner

*Primary Examiner*—Jordan M. Schwartz
*Assistant Examiner*—Jessica Stultz
(74) *Attorney, Agent, or Firm*—Michael I Kroll

(57) ABSTRACT

An apparatus and method for applying and removing a disposable optical film 12 to and from an eyeglass lens 16. The disposable optical film 12 of the present invention 10 has an adhesive element 30 on one side for the removable attachment to an eyeglass lens 16. The adhesive element 30 is protected by a peel and stick backing 28 that has indicia defining the parameters of the corrective film 12, thus allowing the user to trim the corrective film to the appropriate size and shape of a multiplicity of eyeglass styles without compromising the integrity of the corrective film.

16 Claims, 9 Drawing Sheets

METHOD AND DEVICE FOR THE APPLICATION AND REMOVAL OF DISPOSABLE CORRECTIVE OPTICAL FILM TO AN EYEGLASS LENS

BACKGROUND OF THE INVENTION

1. Field of the Invention

The present invention relates generally to corrective optical films and, more specifically, to a method for applying and removing a disposable optical film to and from an eyeglass lens. The disposable optical film of the present invention has an adhesive element on one side for the removable attachment to an eyeglass lens. The adhesive element is protected by a peel and stick backing that has indicia defining the parameters of the corrective film thus allowing the user to trim the corrective film to the appropriate size and shape of a multiplicity of eyeglass styles without compromising the integrity of the corrective film 2. Description of the Prior Art There are other means of converting conventional eyeglasses. Typical of these is U.S. Pat. No. 2,511,329 issued to Craig on Jun. 13, 1950. Another was issued on Aug. 21, 1956 to Evans as U.S. Pat. No. 2,759,394. Still another U.S. Pat. No. 3,236,579 was issued to Evans on Feb. 22, 1966. On Dec. 21, 1971, U.S. Pat. No. 3,628,854 was issued to Jampolsky and Bolle was issued U.S. Pat. No. 5,412,438 on May 2, 1995. U.S. Pat. No. 5,617,153 was issued to Allen, et al. on Apr. 1, 1997. Somsel was issued U.S. Pat. No. 5,764,333 on Jun. 9, 1998 and U.S. Pat. No. 5,790,230 was issued to Seed on Aug. 4, 1998.

Sarfran was issued U.S. Pat. No. 6,290,354 on Sep. 18, 2001 and on May 6, 2003 Edwards was issued U.S. Pat. No. 6,557,995 W.I.P.O. Publication No. WO 95/24669 was issued to Elterman on Sep. 14, 1995 and Japanese Patent No. JP5072504 was issued to Masabumi on Mar. 26, 1993.

U.S. Pat. No. 2,759,394

Inventor: David L. Evans

Issued: Aug. 21, 1956

A glare shield for a concave-convex lens, said shield comprising a thin, pre-formed, substantially non-stretchable self-supporting sheet of tinted transparent material having uniform thickness and of no greater overall plan dimensions than said lens, said sheet comprising a narrow peripheral border portion pre-formed into a pre determined concave shape to conform to the convex surface of said lens, the remaining central major portion of said sheet within the inner periphery of said border portion being curvably pre-formed to a concave curvature greater than the convex curvature of said convex lens surface,1 whereby said central major portion is out of contact with said convex lens surface when said border portion is in conforming contact with said convex lens surface within the periphery of said lens surface, a layer of pressure-sensitive adhesive on only the lens-engaging face of said border portion to removably adhere said sheet to said lens, and an upset portion of said border portion restricted in extent to lie within the peripheral boundaries of said sheet and pre-formed to stand upwardly out of the curved path established by the border portion sufficiently to accept a fingernail thereunder between said upset portion and said lens surface for the purpose of removing said sheet from lens, said upset portion providing by expansion latitude the exact curvature of said border portion to fit lenses of slightly differing convex outer surface curvatures.

U.S. Pat. No. 2,511,329

Inventor: Edward Craig

Issued: Jun. 13, 1950

A cover for a spectacle lens including, a thin flat sheet of tinted transparent material substantially the size and shape of a lens, and an adhesive on one side of the sheet, the sheet being weakened along a line establishing an area that can be removed at will.

U.S. Pat. No. 2,759,394

Inventor: David L. Evans

Issued: Aug. 21, 1956

A glare shield for a concave-convex lens, said shield I comprising a thin, pre-formed, substantially non-stretchable self-supporting sheet of tinted transparent material having uniform thickness and of no greater overall plan dimensions than said lens, said sheet comprising a narrow peripheral border portion pre-formed into a predetermined concave shape to conform to the convex surface of said lens, the remaining central major portion of said sheet within the inner periphery of said border portion being curvably pre-formed to a concave curvature greater than the convex curvature of said convex lens surface, whereby said central major portion is out of contact with said convex lens surface when said border portion is in conforming contact with said convex lens surface within the periphery of said lens surface, a layer of pressure-sensitive adhesive on only the lens-engaging face of said border portion to removably adhere said sheet to said lens, and an upset portion of said border portion restricted in extent to lie within the peripheral boundaries of said sheet and pre-formed to stand upwardly out of the curved path established by the border portion sufficiently to accept a fingernail thereunder between said upset portion and said lens surface for the purpose of removing said sheet from lens, said upset portion providing by expansion latitude the exact curvature of said border portion to fit lenses of slightly differing convex outer surface curvatures.

U.S. Pat. No. 3,236,579

Inventor: David L. Evans

Issued: Feb. 22, 1966

A detachable glare shield for a spectacle lens, said shield comprising in combination a sheet of selectively transparent material, said sheet having an upper end portion and a lower end portion and two side edge portions, said upper end portion having a pair of openings therethrough with one each opening being spaced closely adjacent each of said respective side edge portions, a vacuum cup within each said opening in said sheet, each said vacuum cup having a shoulder portion and a cup portion joined by a neck portion, each said neck portion extending through a respective of said openings, each said vacuum cup further including a stabilizer wedge attached thereto positionable between the lens and said sheet adjacent said upper end portion thereof for urging said lower end portion of said sheet into engagement with the lens when each said vacuum cup is attached to the lens.

U.S. Pat. No. 3,628,854

Inventor: Arthur Jampolsky

Issued: Dec. 21, 1971

A thin, fully conformable, plastic membrane which can be applied, and made to adhere with finger pressure, to spectacle lenses for quickly and impermanently changing one or more optical characteristics of the spectacle lenses. The membrane may be embossed on one of its surfaces to form a Fresnel-type lens or prism structure to introduce a deviation of the light ray, may be partially or entirely tinted to pass only certain wavelengths of light, may be diffused, or blurred uniformly or differentially, may have selective opaqued or transmitting areas or a combination thereof.

U.S. Pat. No. 5,412,438

Inventor: Maurice Bolle

Issued: May 2, 1995

An interchangeable nose-piece for releasable connection to a pair of sport sunglasses is shown. The sport sunglasses include a curved plastic shield and a releasably connected standard nose-piece. The interchangeable nose-piece includes means for supporting a pair of prescription eyeglass lenses and connection means which substantially conform to the standard nose-piece for interchangeable use and releasable connection to the sport sunglass shield.

U.S. Pat. No. 5,617,153

Inventor: Lawrence L. Allen, et al.

Issued: Apr. 1, 1997

A lens shield overlying the outer surface of an eyeglass lens comprising a thin sheet of polymer material with the molecular structure of the periphery of the lens shield corresponding to the molecular structure of the eyeglass lens.

U.S. Pat. No. 5,764,333

Inventor: John R. Somsel

Issued: Jun. 9, 1998

A method and kit for making sunshields for eyeglasses. The sunshields are flexible, transparent sheets of smooth plastic film that are retained on lenses of eyeglasses by electrostatic attraction. The sunshields are made of smooth plastic film having opposed parallel surfaces that are flat and planar except as the film may be curved to match surfaces of the lenses, and absorb some incident electromagnetic radiation. The method includes the steps of laying eyeglasses on a sheet of writing material and tracing an outline of lenses of the eyeglasses on the sheet with a writing implement, cutting along the outlines on the sheet to obtain silhouettes of the lenses, comparing the silhouettes to the lenses in the eyeglasses to see if they match, and laying the silhouettes on a sheet of the smooth plastic film, and cutting the plastic film along the edges of the silhouettes. Also included in the invention is a carrying case for the sunshields, having a material on its interior surface which can impart an electrostatic charge to the sunshields.

U.S. Pat. No. 5,790,230

Inventor: Robert Sved

Issued: Aug. 4, 1998

A combined prescription lens and nose assembly is designed for securing to sport or safety glasses having an integral downwardly facing flange of inverted v-shape, or a separate flange secured to the glasses frame, for extending over a wearer's nose. The assembly includes a flexible nose bridge releasably secured to the flange to engage over a wearer's nose. Separate left and right prescription lenses are separately secured directly to left and right legs of the nose bridge so as to extend closely behind the left and right lens portions of the sunglasses. The lenses are each one piece, frameless members of transparent lens material and the lens material is secured directly to the nose bridge.

U.S. Pat. No. 6,290,354

Inventor: Gordon H. Safran

Issued: Sep. 18, 2001

Non-corrective eyewear such as sunglasses, skiing goggles and diving masks can be easily and economically made to correct eyesight with a corrective eyewear attachment that is aesthetically pleasing. The attachment may include a corrective nose piece connector and/or a rotatable lens. The rotatable lens makes it more economical to have prefabricated corrective lenses that requires a particular lens orientation such as when the corrective lens corrects for an astigmatism.

U.S. Pat. No. 6,557,995

Inventor: James L. Edwards

Issued: May 6, 2003

Temporary, disposable glare shields made of thin flexible tinted plastic film, consisting of a set of two for left side and right side of eyeglasses, self-adhered to eyeglass outer surfaces, extending beyond frame perimeters and around both temporal sides thereby completely shielding all adjacent areas surrounding eyes from potential harmful sunlight UV and other components injurious to sight. In addition, such glare shields provide protection against harmful airborne hazards, strong wind, insects, pollution, contaminants and toxins that may otherwise impact eyes. Said glare shields are a size and shape that substantially fit all sizes and shapes of eyeglasses. They may also be worn directly on the face to cover eyes without eyeglasses, or be worn in this latter way with eyeglasses worn over said glare shields thus providing the sealed peripheral protection of glare shields and the visual improvement of prescription eyeglasses. A convenient pocket-size stowage folder is provided with each set of glare shields that gives instructions for use and may be used to store glare shields after use when and if needed again.

W.I.P.O. Publication Number WO 95/24669

Inventor: Warren B. Elterman

Issued: Sep. 14, 1995

A light shield is provided which includes a relatively thin but preferably rigid body of light permeable material. An arrangement is interposed between the body of light permeable material and one side of the lens to mount the shield directly on the lens in light intercepting relationship relative to the eye of the user of the lens. The shield which is preferably mounted in generally cantilever manner on the lens is removable and can be reinstalled repeatedly. Preferably an adhesive is used which provides for a minimum of residue on the lens and the shield is preferably affixed to the lens in such a way that there is a minimum of optical interference.

Japanese Patent Number JP5072504

Inventor: Shiraishi Masabumi, et al.

Issued: Mar. 26, 1993

Purpose: to provide the additive lenses which have excellent optical characteristics and can well correct sight when surely attached to a goggle body and the visibility meeting the user's sight while the additive lenses are held attached to the goggle body.

Constitution: The goggle body 10A of this case is of a general type and is imparted with the diopter lenses. If the goggle body 10A is first selected by a person desirous of wearing the goggles, the design valve of the additive lenses 20 is determined in accordance with the information on this goggle body 10A and the information on the user's sight. A monomer consisting essentially of a silicon resin is prepared in accordance with the design value and thereafter, the additive lenses are produced by a cast molding method and are further cut to a prescribed shape. The resulted additive lenses 20 are attached to the rear surface Rg of the goggle body 10A complying with the design value without using an adhesive, by which the goggles meeting the user's sight are perfected.

While these eyeglass lens attachments may be suitable for the purposes for which they were designed, they would not be as suitable for the purposes of the present invention, as hereinafter described.

SUMMARY OF THE PRESENT INVENTION

The present invention discloses a device and method for applying and removing a disposable optical film to and from an eyeglass lens. The disposable optical film of the present invention has an adhesive element on one side for the removable attachment to an eyeglass lens. The adhesive element is protected by a peel and stick backing that has indicia defining the parameters of the corrective film, thus allowing the user to trim the corrective film to the appropriate size and shape of a multiplicity of eyeglass styles without compromising the integrity of the corrective film.

A primary object of the present invention is to provide a corrective optical film that is applied to a non-corrective eyeglass lens such as a typical sunglass lens to convert that lens to a corrective lens.

Another object of the present invention is to provide a corrective optical film having an adhesive that secures the film to the lens.

Yet another object of the present invention is to provide a corrective optical film that is disposable and may easily be removed by the user.

Still yet another object of the present invention is to provide a corrective optical film that may be cut to size and shape by the user or optician to fit the lens to be converted.

Yet another object of the present invention is to provide a peel and stick backing to protect the adhesive of the film and to act as a template defining the parameters of the optical range of the film.

Still yet another object of the present invention is to provide means for positioning the film in order that the adhesive side doesn't prematurely stick on the sunglasses by applying a spray of water in order to position the film before it is in place.

Another object of the present invention is to provide a corrective optical film that is inexpensive to manufacture.

Another object of the present invention is to provide a corrective optical film that is simple and easy to use.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
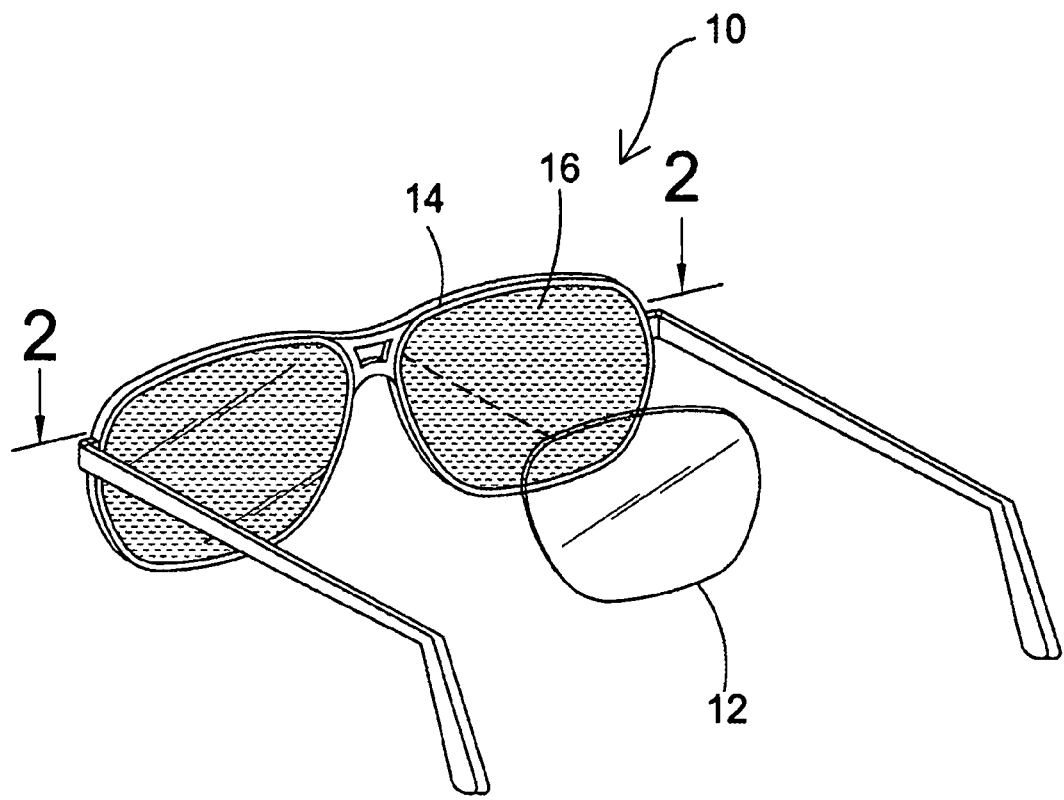
FIG. 1 is a perspective view of the present invention.

With regard to reference numerals used, the following numbering is used throughout the drawings 10 present invention
12 corrective film
14 conventional sunglasses
16 lens
18 adhering means
20 frame
22 bridge
24 sheet 26 sheet film elements
28 peel and stick backing
30 adhesive
32 inner circle
24 warning
36 dashed line
38 template

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is a perspective view of the present invention 10. Shown is the corrective optical film 12 of the present invention 10 and a pair of conventional non-corrective sunglasses 14 to which the film is to be applied to convert the sunglasses to corrective lenses. The corrective optical film 12 of the present invention 10 includes an adhesive backing to adhere the film to the lens 16 of the sunglasses 14.

Figure 2:
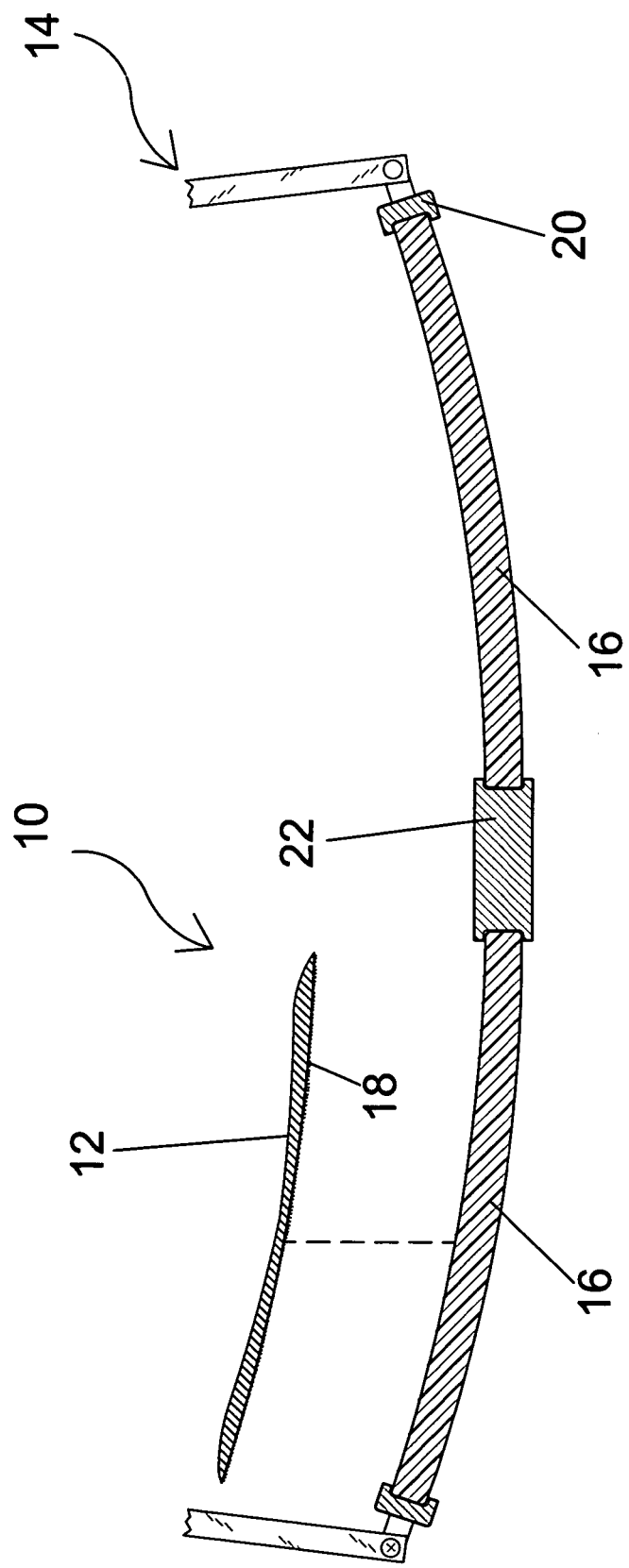
FIG. 2 is a sectional view of the present invention.

Turning to FIG. 2, shown therein is a sectional view of the present invention 10. Shown is the corrective optical lens film 12 of the present invention 10 and a pair of conventional non-corrective sunglasses 14 to which the film is to be applied to convert the sunglasses to corrective lenses. The corrective optical lens film 12 of the present invention 10 includes a releasable adhering means 18. That may include but is not limited to, a peel-off adhesive backing, a self sticking backing with a spray-on mist or any other suitable backing with a spray-on mist or any other suitable means to effectively adhere the film to the lens 16. Furthermore, in order that the adhesive side doesn't prematurely stick on the sunglasses, a spray of water can be applied in order to position the film before it is in place. Also shown are the frame 20 and bridge 22 of conventional sunglasses 14.

Figure 3:
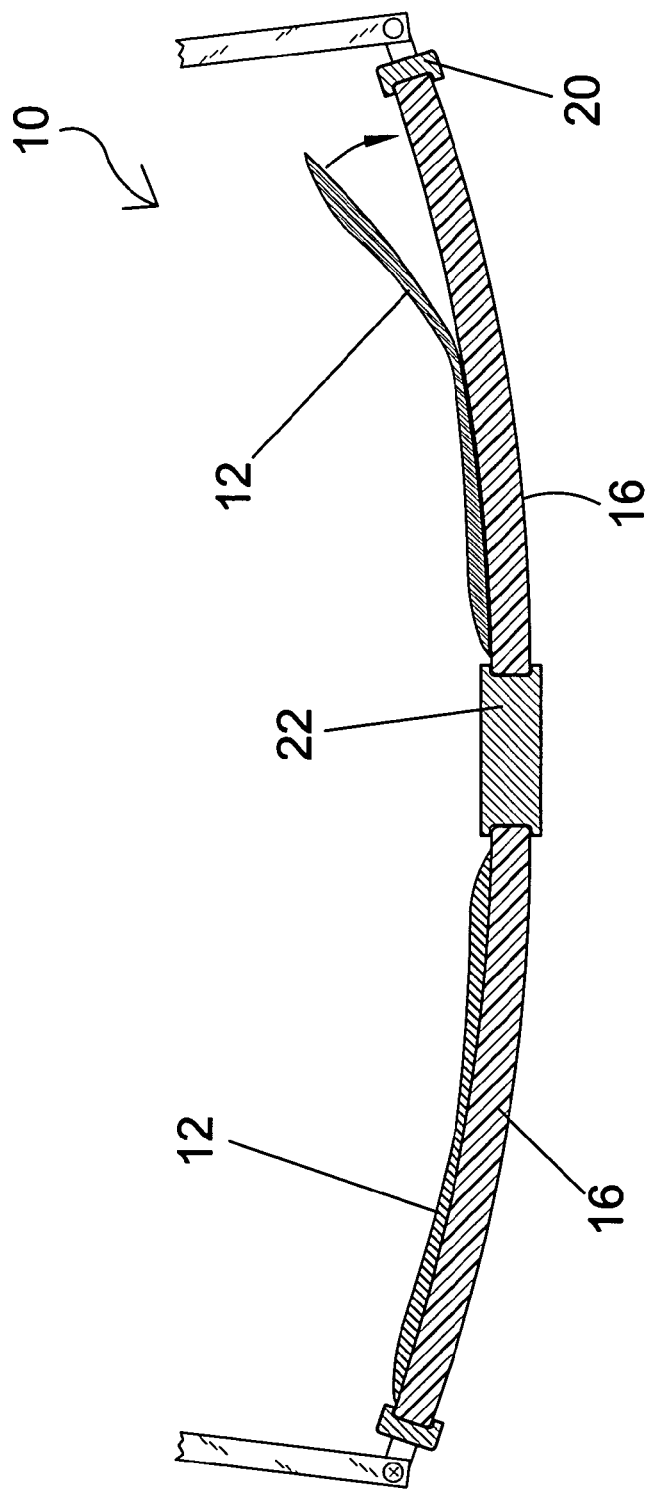
FIG. 3 is a sectional view of the present invention.

Turning to FIG. 3, shown therein is a sectional view of the present invention 10. Shown is one corrective optical film 12 of the present invention 10 coupled with its respective lens 16 and the other film 12 being applied to the other lens 16. Also shown are frame 20 and bridge 22.

Figure 4:
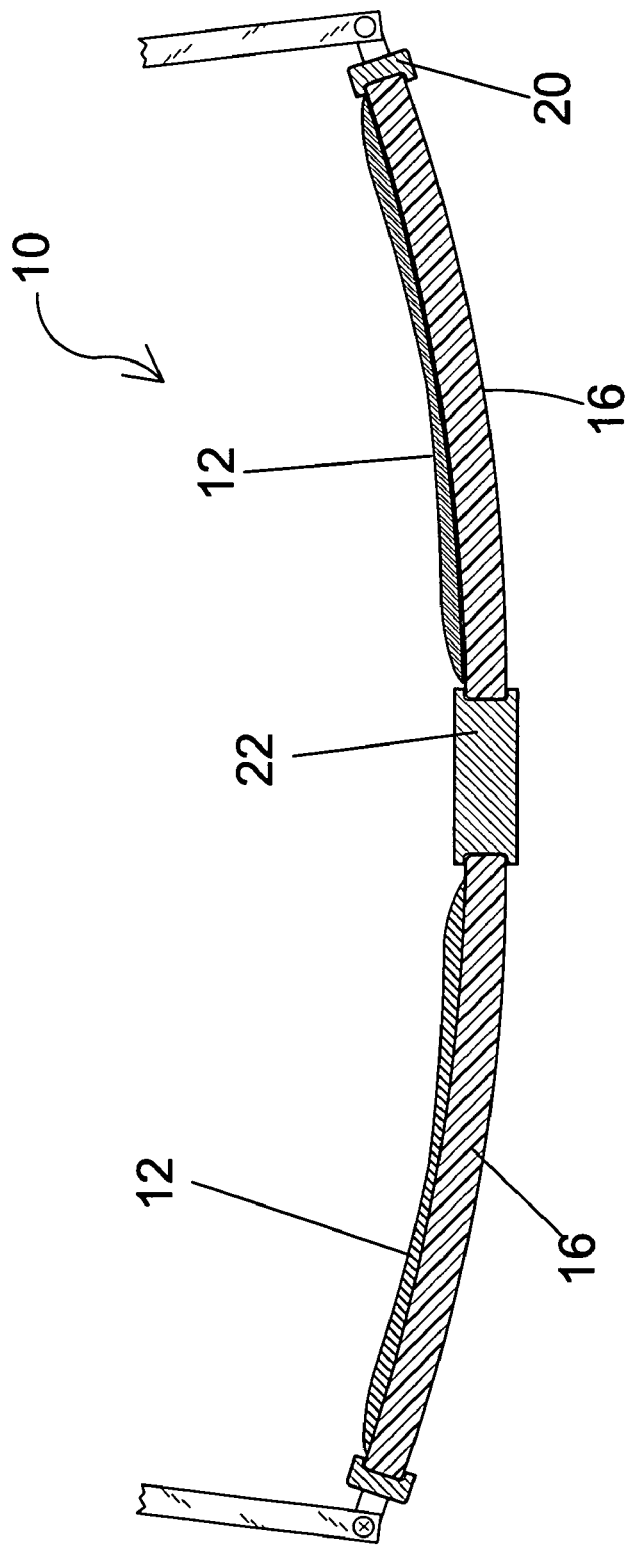
FIG. 4 is a sectional side view of the present invention.

Turning to FIG. 4, shown therein is a sectional side view of the present invention 10. Shown is the corrective optical lens film 12 of the present invention 10 applied to both lenses 16. The user may use film 12 having differing characteristics according to the users needs. Also shown are frame 20 and bridge 22.

Figure 5:
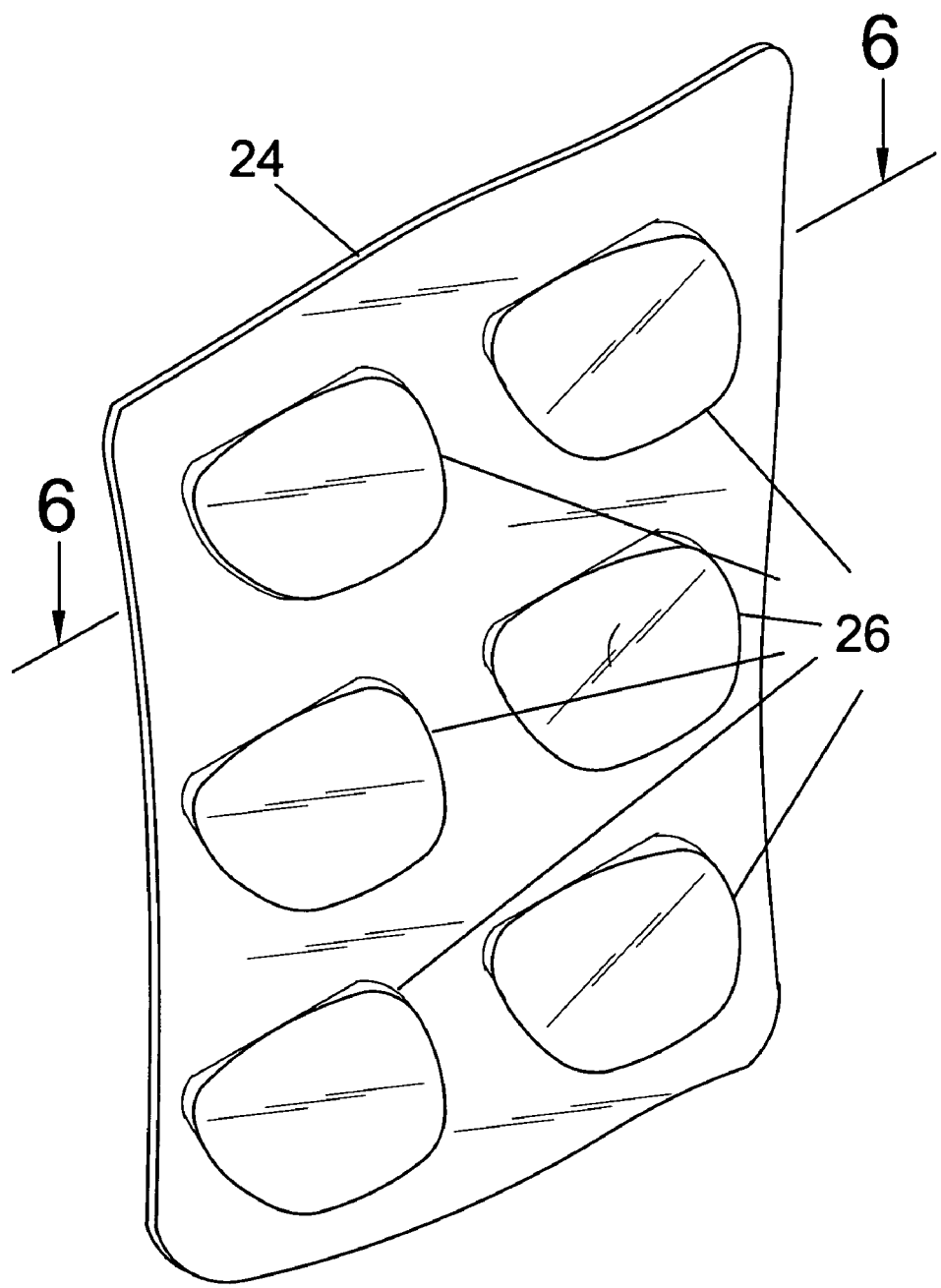
FIG. 5 is a perspective view of the sheet of the present invention.

Turning to FIG. 5, shown therein is a perspective view of the sheet 24 of the present invention. Shown is a plurality of the corrective optical film elements 26 of the present invention disposed on a single sheet 24. The film 26 is cut to accommodate the size and shape of the lens on which it is to be installed. Each sheet 24 may have one or more pairs of the optical lens 26 disposed thereon.

Figure 6:
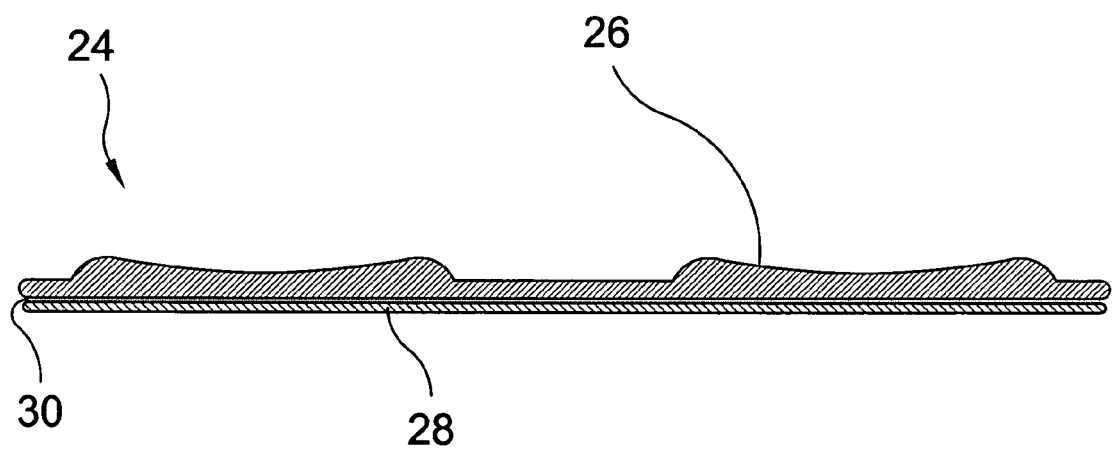
FIG. 6 is a sectional view of the sheet of the present invention.

Turning to FIG. 6, shown therein is a sectional view of the sheet 24 of the present invention taken from FIG. 5 as indicated. Shown is a plurality of the corrective optical film elements 26 of the present invention disposed on a single sheet 24. The film 26 is cut to accommodate the size and shape of the lens on which it is to be installed. The releasable adhering means shown is a peel and stick backing 28 although other appropriate means may be used as was previously mentioned. The customer will receive the square cut-out which then, in turn, is cut and applied to the appropriate lens. In order that the adhesive side doesn't prematurely stick on the sunglasses, a spray of water can be applied to position the film before it is in place. In cases that require two different lenses on one pair of glasses, the customer would receive a square from two different sheets. Also shown is adhesive 30.

Figure 7:
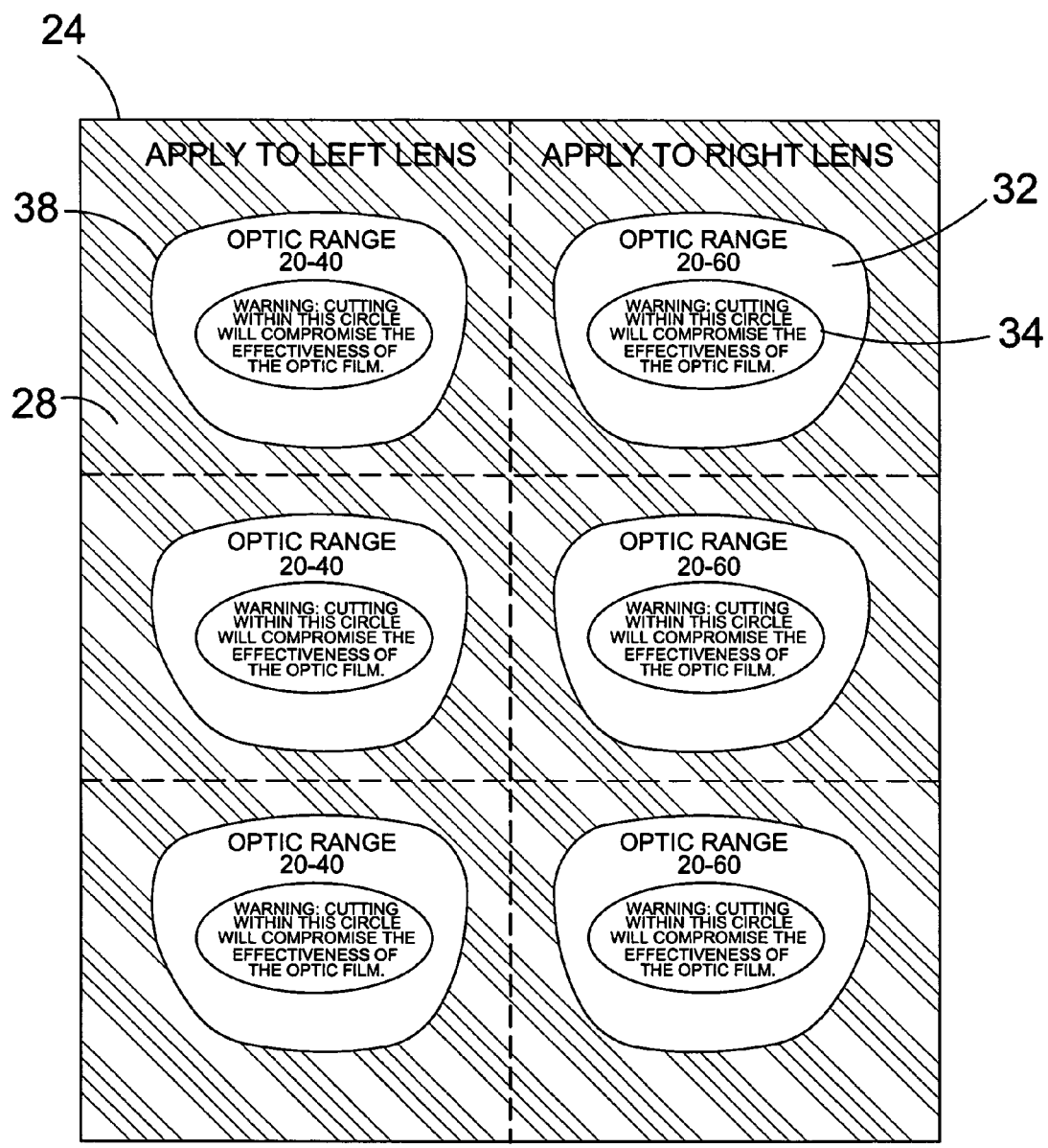
FIG. 7 is a rear view of the sheet of the present invention.

Turning to FIG. 7, shown therein is a rear view of the sheet 24 of the present invention. Shown is the peel and stick backing 28 of the sheet 24 of the present invention wherein the backing also serves as a template 38 onto which the user places the lens of the eyeglasses within the optical range of the film and traces the shape of the lens onto the backing paper. The film is then cut within the traced outline for custom sizing to a variety of eyeglass styles. The inner circle 32 defines the optical characteristics or parameters of the corrective portion of the film and has a warning 34 to prevent the user from inadvertently reducing the effectiveness thereof. The sheet 24 may include optical film of two different prescriptions when the users eyes so require.

Figure 8:
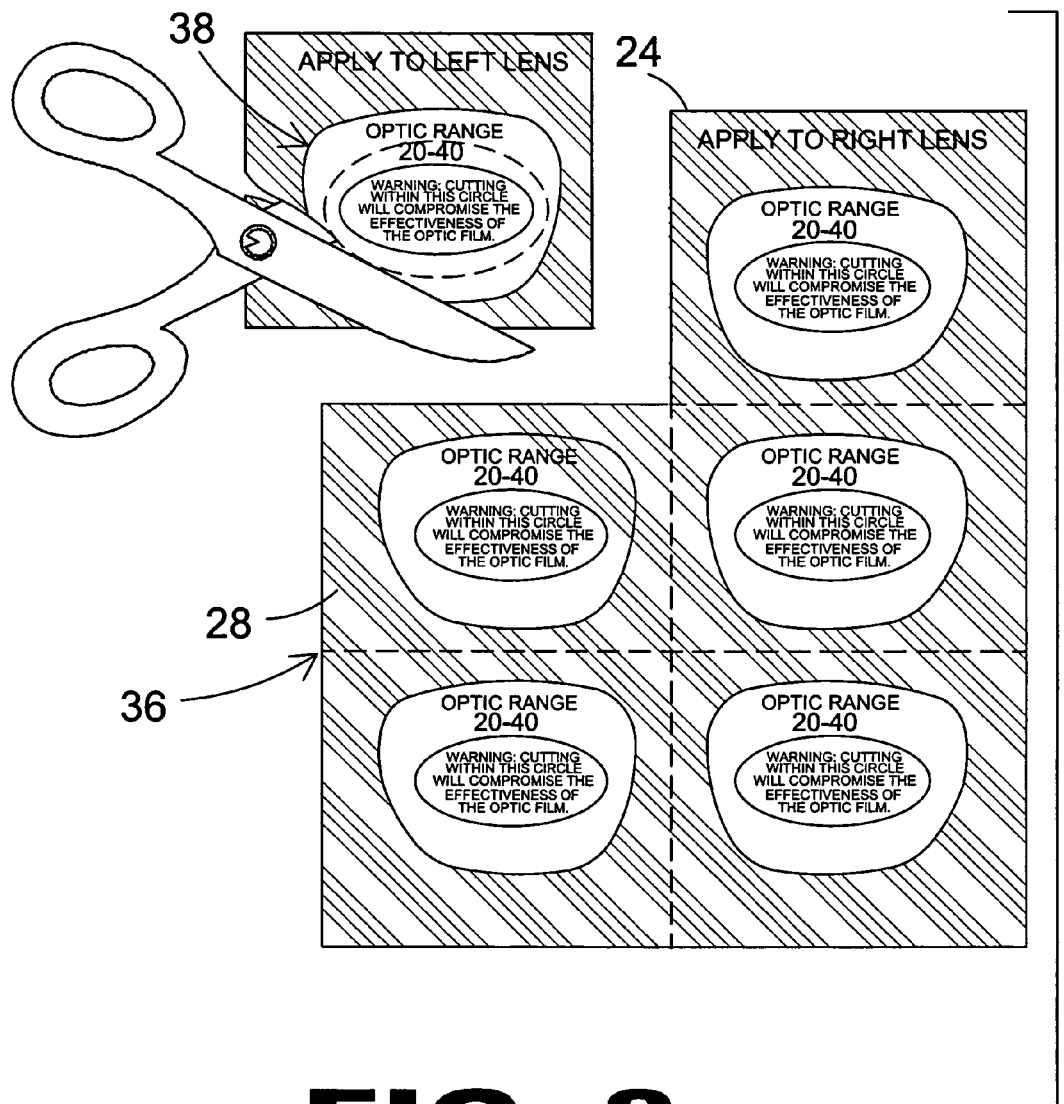
FIG. 8 is a rear view of the sheet of the present invention.

Turning to FIG. 8, shown therein is a rear view of the sheet 24 of the present invention. Shown is the peel and stick backing 28 of the sheet 24 of the present invention wherein the dashed line 36 represents the template 38 traced by the user. The film is then cut within the template, taking care not to cut within the inner oval 32. A peel and stick adhering means is depicted but, as previously addressed, any suitable releasable adhering means may be employed.

Figure 9:
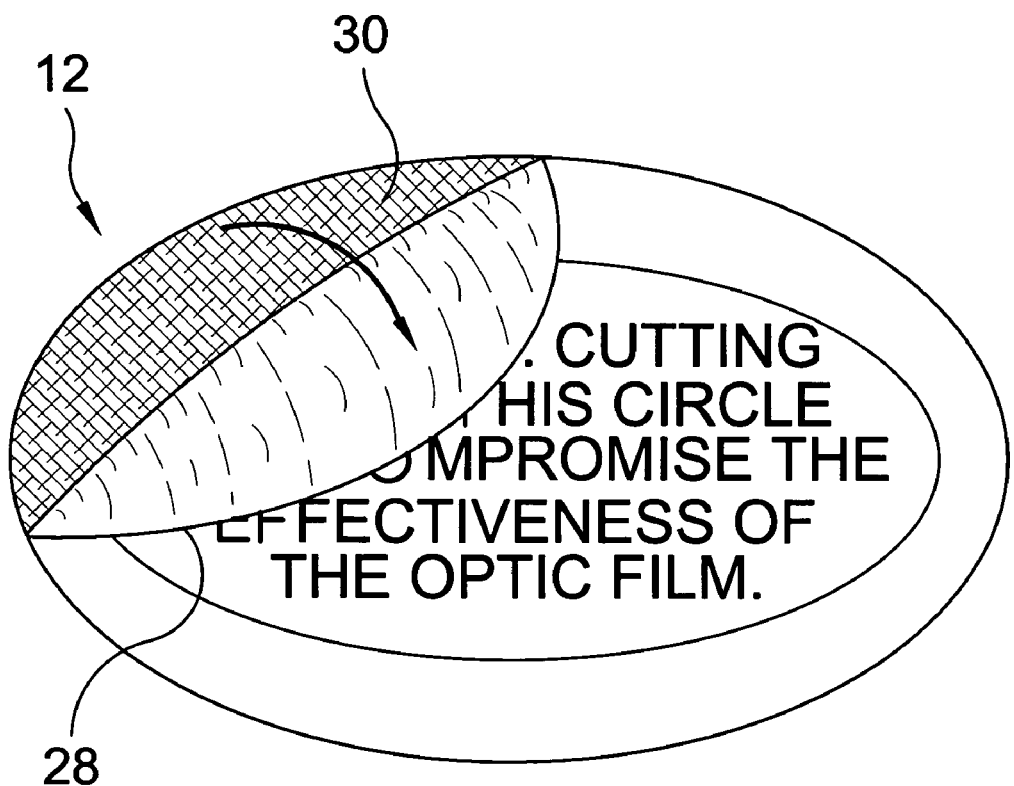
FIG. 9 is a rear view of the present invention.

Turning to FIG. 9, shown therein is a rear view of the present invention. Shown is the peel and stick backing 28 of the sheet of the present invention being removed from the film 12 after it has been trimmed down to the appropriate size. The adhesive 30 is transparent but is shown as such for illustrative purposes. The adhesive 30 is placed against the inside of the corresponding lens where it remains until the user decides to remove it therefrom.

I claim:

1. An apparatus comprising corrective optical film for attachment to lens of eyeglasses to be corrected, comprising:
    a) a prescription corrective optical film having first and second sides, wherein said first side is to be contiguous to the lens of the eyeglasses, said corrective optical film cut to full size and shape of the lens to be corrected, and,
    b) an adhering element being disposed on said first side of said film so as to adhere said film to the lens of the eyeglasses.

2. The apparatus of claim 1, wherein said adhering element is releasable.

3. The apparatus of claim 2, wherein said adhering element comprises adhesive.

4. The apparatus of claim 3, wherein said adhering element comprises a peel-off adhesive backing.

5. The apparatus of claim 4, wherein said adhering element comprises spray-on mist.

6. The apparatus of claim 5, further comprising a generally planar sheet having prescription corrective optical films disposed thereon.

7. The apparatus of claim 6, wherein said planar sheet comprises prescription corrective optical films having at least two different optical characteristics.

8. The apparatus of claim 7, further comprising indicia indicating the optical characteristics of the corrective optical film being disposed on said sheet.

9. The apparatus of claim 8, further comprising an outline of the template of each corrective optical film being disposed on said sheet.

10. The apparatus of claim 9, further comprising indicia outlining an area on each film not to be cut.

11. A method of applying and removing disposable prescription correcting optical film to the lens of non corrected eyeglasses; comprising:
   a) providing a generally planar sheet having corrective optical films disposed thereon, each film having first and second sides, wherein the first side is to be contiguous to the lens of the eyeglasses;
   b) cutting each said prescription corrective optical film to full size and shape of the lens to be corrected; and,
   c) placing an adhering element on the first side of the film to adhere the film to the lens of the eyeglasses.

12. The method of claim 11, in which said eyeglasses are sunglasses and further comprising the steps of:
   a) outlining a template of the corrective optical film on the sheet to allow a user to see the area of the corrective optical film;
   b) tracing the shape of the lens of the sunglasses onto the area within the template on the sheet so that the corrective optical film can be properly sized; and,
   c) cutting the corrective optical film from the sheet by cutting along the template and placing the film onto the lens of the sunglasses to cover the lens completely.

13. The method of claim 12, comprising the steps of:
   a) placing indicia on the corrective optical film indicating the optical characteristics of the film, and,
   b) outlining an area on the corrective optical film not to be cut.

14. The method of claim 13, farther comprising the step of placing a peel and stick backing on the corrective optical film to adhere the film to the lens of the sunglasses.

15. The method of claim 14, further comprising the step of removing the corrective optical film from the lens of the sunglasses.

16. The method of claim 12, further comprising the step of applying a spray of water onto the sunglasses inhibiting the adhesive side from prematurely sticking to the sunglasses while the film is being positioned.

* * * * *